(12) United States Patent
Parker

(10) Patent No.: US 7,835,330 B2
(45) Date of Patent: Nov. 16, 2010

(54) ACCESSING A DATA NETWORK THROUGH A CELLULAR COMMUNICATION SYSTEM

(75) Inventor: Andrew James Parker, West Midlands (GB)

(73) Assignee: IPWireless, Inc., San Francisco, CA (US)

( * ) Notice: Subject to any disclaimer, the term of this patent is extended or adjusted under 35 U.S.C. 154(b) by 749 days.

(21) Appl. No.: 10/873,065

(22) Filed: Jun. 21, 2004

(65) Prior Publication Data

US 2005/0281233 A1    Dec. 22, 2005

(51) Int. Cl.
*H04W 4/00*    (2009.01)

(52) U.S. Cl. .................. 370/338; 370/310; 370/329; 370/341; 370/349; 455/435.3; 455/464; 455/525; 455/151.1; 709/227; 709/228; 709/229

(58) Field of Classification Search .............. 370/338, 370/469, 310, 329, 341; 709/227–229; 455/435.1–435.3, 455/464, 525, 151.1, 166.2

See application file for complete search history.

(56) References Cited

U.S. PATENT DOCUMENTS

| | | | | |
|---|---|---|---|---|
| 6,987,779 | B1 * | 1/2006 | Sevanto et al. ............. | 370/469 |
| 2004/0054794 | A1 * | 3/2004 | Lantto et al. ............... | 709/229 |
| 2005/0281233 | A1 * | 12/2005 | Parker ....................... | 370/338 |

FOREIGN PATENT DOCUMENTS

| | | |
|---|---|---|
| GB | 2373409 A1 | 9/2002 |
| WO | WO-03009614 A1 | 1/2003 |

OTHER PUBLICATIONS

3GPP (Sep. 2003). "3rd Generation Partnership Project; Technical Specification Group Terminals; AT Command Set for User Equipment (UE) (Release 6)," *3GPP* TS 27.007 V6.4.0, pp. 1-169.

3GPP (Mar. 2004). "3rd Generation Partnership Project; Technical Specification Group Core Network; Numbering, Addressing and Identification (Release 6)," *3GPP* TS 23.003 V6.2.0, pp. 1-41.

International Telecommunication Union. (May 1999). "Series V: Data Communication Over the Telephone Network Control Procedures: Serial Asynchronous Automatic Dialling and Control," *International Telecommunication Union*, ITU-T V.250 (May 1999), 91 pages.

3GPP (Sep. 2003). "Digital cellular telecommunications system (phase 2+); Universal Mobile Telecommunications System (UMTS); AT command set for 3G User Equipment (UE)." 3GPP TS 27.007 version 5.4.0 Release 5, 171 pages.

International Search Report and Written Opinion mailed Sep. 6, 2005, for PCT Application No. PCT/EP2005/052795, filed Jun. 16, 2005, 13 pages.

* cited by examiner

*Primary Examiner*—Wayne Cai
(74) *Attorney, Agent, or Firm*—Fitch Even Tabin & Flannery

(57) ABSTRACT

Wireless access equipment provides access to a data network, such as the Internet, through a cellular communication system. A command receiver receives commands from terminal equipment in accordance with an interface protocol, which may be a dial-up protocol. A first access point identifier is stored in an APN store. When a session setup command is received, an APN controller selects between the first and a second access point identifier in response to a parameter of the session setup command. For example, the session setup command may comprise an access point identifier overriding the stored first access point identifier. A session controller proceeds to set up a packet data session of the cellular communication system to the data network using the selected session access point identifier. Embodiments of the invention may provide a flexible and user friendly means of supporting a plurality of network access points through a cellular communication system.

35 Claims, 2 Drawing Sheets

ACCESSING A DATA NETWORK THROUGH A CELLULAR COMMUNICATION SYSTEM

BACKGROUND OF THE INVENTION

1. Field of the Invention

The invention relates to a method and apparatus for accessing a data network through a communication system and in particular for accessing the Internet through a cellular communication system.

2. Description of the Related Art

In the last decade, private and public data networks have become increasingly widespread. In particular, the popularity of the Internet has increased explosively and currently a large and increasing proportion of households have Internet access.

Originally private Internet access was typically achieved through the use of a dial-up modem that sets up a data connection to an access provider through a phone line. For dial-up modems, each Internet provider typically has dedicated telephone numbers which are called by the dial-up modem to provide the Internet connection.

Increasingly dial-up modems are being replaced by other access equipment providing improved quality of service to the user. Cable modems and ADSL (Asynchronous Digital Subscriber Line) modems are increasingly being used to provide Internet access as these allow significantly better quality of service and in particular higher achievable data rates and increased connection reliability. In contrast to the dial-up modems, these modems utilize packet data technology thereby allowing an always-on connection without requiring a dedicated connection being continuously active.

Recently, systems for providing wireless access using wireless access equipment have emerged. Such wireless access facilitates distribution and may reduce infrastructure cost as there is no requirement for expensive physical connections to be implemented for the individual user thereby allowing the operator efficiently and cost effectively to offer service to customers throughout a marketplace. Furthermore, the wireless access may provide mobility thereby freeing the user terminal from being tied to a fixed location.

Wireless data systems have been proposed which utilize cellular communication technology implementing an access network for data networks such as the Internet. Such an approach provides the advantages of utilizing a detailed, standardized and flexible technology for providing access to the data network. Furthermore, cellular technologies provide a high spectral efficiency and a wide coverage using relatively few base stations thereby reducing infrastructure cost.

Such a system may advantageously be based on packet data functionality of a cellular communication system such as the Universal Mobile Telecommunication System (UMTS) or Global System for Mobile communications (GSM). UMTS has been standardized in the 3rd Generation Partnership Project (3GPP) Technical Specifications which provide for a range of data services including packet data services suitable for providing appropriate services to a user.

GSM is currently the most ubiquitous cellular communication system. GSM is known as a 2nd generation cellular communication system and originally did not support packet data communications services. However, to further enhance the services and performance of the GSM communication system, a number of enhancements and additions have been introduced to the GSM communication system over the years. One such enhancement is the General Packet Radio System (GPRS), which is a system developed for enabling packet data based communication in a GSM communication system. The GPRS system is compatible with the GSM (voice) system and provides a number of additional services which augments and complements the circuit switched communication of a traditional communication system. The GPRS system has been standardized as an add-on to an existing GSM communication system, and can be introduced to an existing GSM communication system by introducing new network elements. For example, a number of Serving GPRS Support Nodes (SGSN) and Gateway GPRS Support Nodes (GGSN) may be introduced to provide a packet based fixed network communication. Furthermore, the network of a UMTS communication system is built around GGSNs and SGSNs thereby providing network compatibility between the systems.

In systems such as UMTS and GSM GPRS, it is necessary to initiate services in accordance with the specifications of the cellular communication services. For example, for systems such as UMTS, data packet sessions are set up for a given user by using an access point name. The access point name is an indication of the destination point for a data session for the access equipment. For example, the access point name refers to a Gateway GPRS Support Node (GGSN) providing an interface to the external data network such as the Internet. The use and format of the access point name in UMTS is further defined in 3GPP TS 23.003 v6.2.0 (2004-03) "3rd Generation Partnership Project; Technical Specification Group Core Network; Numbering, addressing and identification (Release 6)."

When setting up a new session for terminal equipment, such as a personal computer (PC), the access equipment must provide the correct access point name identifying the destination GGSN. Typically, the access point name depends on the service provider. In some systems, the access equipment may have a permanently stored access point name corresponding to a service provider. For example, if a wireless modem is supplied by a given service provider, this may have an access point name stored in Read Only Memory (ROM). When the modem receives commands to set up an Internet session, the stored access point name is retrieved and used to identify the destination GGSN.

In some systems, the access point name may be loaded into the access equipment from the terminal equipment. For example, an installation program associated with the modem may download the access point name from a PC to the wireless modem during installation. This may allow a manufacturer to provide the same modem to different Internet service providers together with a customized installation disk that comprises the appropriate access point name for that Internet service provider.

In order to provide backwards compatibility, it is preferable that commands suitable for a dial-up modem may also be used for the wireless access equipment. Therefore, the wireless access equipment may operable to instigate a data session in response to receiving a dial-up command requesting that the modem performs a dial-up.

For example, in Technical Specification 3GPP TS 27.007 v6.4.0 (2003-09) "3rd Generation Partnership Project; Technical Specification Group Terminals; AT command set for User Equipment (UE) (Release 6)," 3GPP has made provision for use of the AT (attention) command set, which is an international standard for terminal to modem interface control. The extended command range AT+C is reserved by the International Telecommunication Union (ITU) for use with GSM/UMTS mobile equipment in ITU-T Recommendation V.25ter.

In accordance with the Technical Specifications, standard AT commands must be supported by GSM/UMTS User Equipment (UE) but can optionally be ignored in some cases. For example, the Technical Specifications provide for the use of the AT command AT+CGDCONT to feed an access point name to wireless access equipment. Thus, during installation of a wireless access system, a PC may download an access point name of the service provider to the wireless access equipment by sending an AT+CGDCONT command.

The standard AT dial command ATD is defined in 3GPP to be used to send a defined string for making a call or controlling supplementary services such as call divert. The Technical Specifications, for example, prescribe that when the wireless access equipment receives an ATD command with a dial string of <*99#>, a new data session should be instigated using the stored access point name. Accordingly, the wireless access equipment proceeds to set up a Packet Data Protocol (PDP) context for the data session using the stored access point name. As part of the setup process, the cellular communication system determines the appropriate point of accessing the Internet in response to the received access point name.

The access point name is typically a domain name associated with the service provider. For example, an access point name of "IPWireless.com" or "aol.com" may be sent to the cellular communication system which in response determines the appropriate GGSN for accessing the Internet via the appropriate Internet service provider.

Hence, a conventional wireless access system allows for standard dial-up commands to be used to access a data network such as the Internet through a cellular communication system. However, the approach tends to be very inflexible and is not user friendly. For example, setting up the wireless access equipment to use the appropriate access point name is cumbersome, inflexible and not user friendly and tends to be performed by an installation program having specified parameters. For example, it is impossible, impractical or cumbersome for a user to change from one service provider to another as this requires a reconfiguration of the wireless access equipment.

This is becoming a considerable disadvantage as it becomes increasingly common for a user to employ a plurality of Internet service providers. For example, the same PC may be used both privately and professionally with different Internet service providers being used for each purpose. However, reconfiguring the wireless access equipment, e.g., by running an installation program every time a user switches between the service providers, is highly impractical. Similarly, setting up wireless access equipment with a new Internet service provider may result in existing applications malfunctioning as these may be specific for a previous Internet service provider.

Hence, an improved system for accessing a data network through a cellular communication system would be advantageous and in particular a system allowing increased flexibility, increased user friendliness and/or improved performance would be advantageous.

BRIEF SUMMARY OF THE INVENTION

Accordingly, embodiments of the invention may seek to mitigate, alleviate or eliminate one or more of the above mentioned disadvantages singly or in any combination.

In accordance with an aspect of the invention there is provided an apparatus for accessing a data network through a cellular communication system, the apparatus comprising: a receiver for receiving commands from terminal equipment in accordance with an interface protocol; memory for storing a first access point identifier; a first controller for setting up a packet data session of the cellular communication system to the data network in response to receiving a session setup command and using a session access point identifier; and a second controller for selecting the session access point identifier as the first access point identifier or a second access point identifier in response to a parameter of the session setup command.

Improved flexibility and/or performance may be achieved when accessing a data network through a cellular communication system by allowing a dynamic configuration of access point identifiers used for setting up packet data sessions. The access point identifier may be an access point name. In particular, a session setup command may be used to select between different access point names. This may allow specific access point names to be selected for a given data packet session without requiring reconfiguration of the apparatus or a previous set up of the access point name for the specific session.

Some embodiments of the invention may optionally enable or facilitate a system wherein a plurality of service providers and/or network access points may be flexibly used with low complexity. For example, the data network may be the Internet and the first and second access point names may be associated with different Internet service providers.

Some embodiments of the invention may optionally provide a high degree of user friendliness allowing a user to select a suitable access point name through the use of a simple session setup command. For example, the invention may allow a simple and user friendly system wherein a default access point name is stored as the first access point name. A packet data session may be set up using the default value or the default access point name may easily be substituted by another access point name as indicated in the session setup command.

Some embodiments of the invention optionally facilitate installation of a new apparatus for accessing the data network as a default value may be stored by an installation routine while allowing for this to be easily substituted by existing applications.

The cellular communication system may, e.g., be any radio communication system adhering to the technical specifications of a cellular communication system such as GSM, GPRS, UMTS, TETRA or CDMA 2000. The session setup command may be a command that instigates the setting up of a packet data session or may be a command which is received as part of the packet data session set up process.

According to an optional feature, some embodiments of the invention, further comprises a third controller for determining the second access point name from a parameter of the session setup command.

This optional feature of the invention may optionally provide for a particularly low complexity, flexible and/or user friendly way of providing for multiple access point names thereby supporting a plurality of access points for example corresponding to a plurality of service providers. For example, some embodiments allow for a default access point name to be used in response to a session setup command while allowing a different access point name to easily be substituted by including the different access point name as a parameter of the session setup command. Hence, some embodiments allow increased flexibility and functionality while allowing for a simple default use.

According to an optional feature of the invention, the parameter of the session setup command comprises the second access point name. This provides for a simple implementation.

According to an optional feature of the invention, the second controller is operable to select the first access point name if the parameter has a predetermined value. This provides a simple and efficient implementation which is compatible with many existing interface protocols.

According to an optional feature of the invention, the apparatus is operable to preserve the first access point name when the second controller selects the second access point name. This may ensure that the second access point name is only used for sessions for which it is specifically selected and that the default value of the stored first access point name is not changed. This may facilitate operation in many implementations.

According to an optional feature of the invention, the apparatus is operable to set the first access point name to the second access point name if the second controller selects the second access point name. This may facilitate operation in many operations and may in particular provide a simple mechanism for ensuring that a data packet session by default uses the access point name of the previous session.

According to an optional feature of the invention, the interface protocol is a dial-up protocol. This may allow backwards compatibility. Some embodiments provide for a simple mechanism for supporting a plurality of access points or access providers for the data network which is compatible with dial-up applications. Some embodiments provide increased user friendliness as dial-up protocols typically are well known and easy to modify and manage by a user or user application.

According to an optional feature of the invention, the interface protocol is a point to point protocol. In some embodiments, the interface protocol may be a multi-point to point protocol or a multi-point to multi-point interface protocol. Optionally, some embodiments provide a point to point protocol providing communication directly between terminal equipment and the apparatus. The interface protocol may specifically be the Point to Point Protocol (PPP) specified in Internet Engineering Task Force (IETF) Request For Comment (RFC) 1661.

According to an optional feature of the invention, the interface protocol is an AT command interface protocol as defined in the 3rd Generation Partnership Project Technical Specification 3GPP TS 27.007 and in ITU-T Recommendation V.25ter. Optionally, some embodiments may allow the AT command interface protocol to be used to flexibly and easily support setting up of data packets sessions to different access points through a cellular communication system. This may in particular enable or facilitate the use of existing dial-up applications.

According to an optional feature of the invention, the session setup command is an ATD command and the parameter may optionally be a dial string of the ATD command. This may provide for a simple, flexible, user friendly and/or backwards compatible mechanism for accessing the data network through the cellular communication system while supporting a plurality of access points.

According to an optional feature of the invention, the second controller is operable to select the first access point name if the dial string has a predetermined value. For example, if an ATD command having the predetermined dial string of <*99#> is received, the apparatus may set up the packet data session using the stored first access point name, and otherwise the second access point name may be used. This may provide for a simple implementation and be compatible with, e.g., the Technical Specifications of UMTS.

According to an optional feature of the invention, the second controller is operable to set the session access point name to a value of the dial string if the dial string does not have a predetermined value. This feature may provide for an easy to implement and user friendly way of substituting a stored access point name with a specific access point name for the current session. For example, the user may manually modify the dial string accompanying the ATD command to the desired access point name.

According to an optional feature of the invention, the interface protocol is a Point to Point Protocol over Ethernet (PPPoE) protocol. Some embodiments allow for the PPPoE protocol to be used to flexibly and easily support setting up of data packets sessions to different access points through a cellular communication system. This feature may enable or facilitate the use of existing dial-up applications.

According to an optional feature of the invention, the session setup command is a Point to Point Protocol over Ethernet (PPPoE) service name message as specified in Internet Engineering Task Force (IETF) Request For Comment (RFC) 2516. This message may be a particularly suitable message for controlling the selection of an access point name for a packet data session. The second controller may be operable to select the first access point name when the PPPoE service name message comprises a predetermined value. Alternatively or additionally, the second controller may be operable to set the session access point name to a value of the service name in the PPPoE service name message if the dial string does not have a predetermined value.

According to an optional feature of the invention, the second controller for up the packet data session is operable to initiate a Packet Data Protocol (PDP) context using the selected access point name. For example, the PDP context may be initiated by a PDP Context Activate Request comprising the session access point name. This may provide a suitable method of setting up the packet data section compatible with the Technical Specifications of, e.g., UMTS.

According to an optional feature of the invention, the apparatus further comprises a fourth controller for setting the first access point name to a value in response to receiving a packet data session destination command. The packet data session destination command may comprise an access point name. The packet data session destination command may specifically be an AT+CGDCONT command when the interface protocol is an AT command interface protocol. This may provide for a user friendly means of modifying the stored default first access point name. Hence, further flexibility and control of the access point name used for setting up a packet data session through the cellular communication system may be achieved.

According to a second aspect of the invention, there is provided a network comprising an apparatus including any combination of the previous described features and/or embodiments and further comprising: a processor for operating a dial-up network application; and an interface controller for transmitting commands to the apparatus using the interface protocol in response to the dial-up application. The processor may be terminal equipment such as a PC. The network application may for example be a Microsoft™ Windows™ application.

According to a third aspect of the invention, there is provided a method of accessing a data network through a cellular communication system, the method comprising the steps of: receiving commands from terminal equipment in accordance with an interface protocol; storing a first access point name; setting up a packet data session of the cellular communication system to the data network in response to receiving a session setup command and using a session access point name; and selecting the session access point name as the first access point name or a second access point name in response to a parameter of the session setup command.

These and other aspects, features and advantages of the invention will be apparent from and elucidated with reference to the embodiment(s) described hereinafter.

BRIEF DESCRIPTION OF THE DRAWINGS

Embodiments of the Invention will be described, by way of example, with reference to the drawings, in which.

DETAILED DESCRIPTION OF THE EMBODIMENTS OF THE INVENTION

The following description focuses on embodiments of the invention applicable to accessing the Internet through a cellular communication system compatible with the Technical Specifications of UMTS. However, it will be appreciated that the invention is not limited to a UMTS application but may be applied to many other data networks and cellular communication systems including for example a GSM/GPRS cellular communication system.

Figure 1:
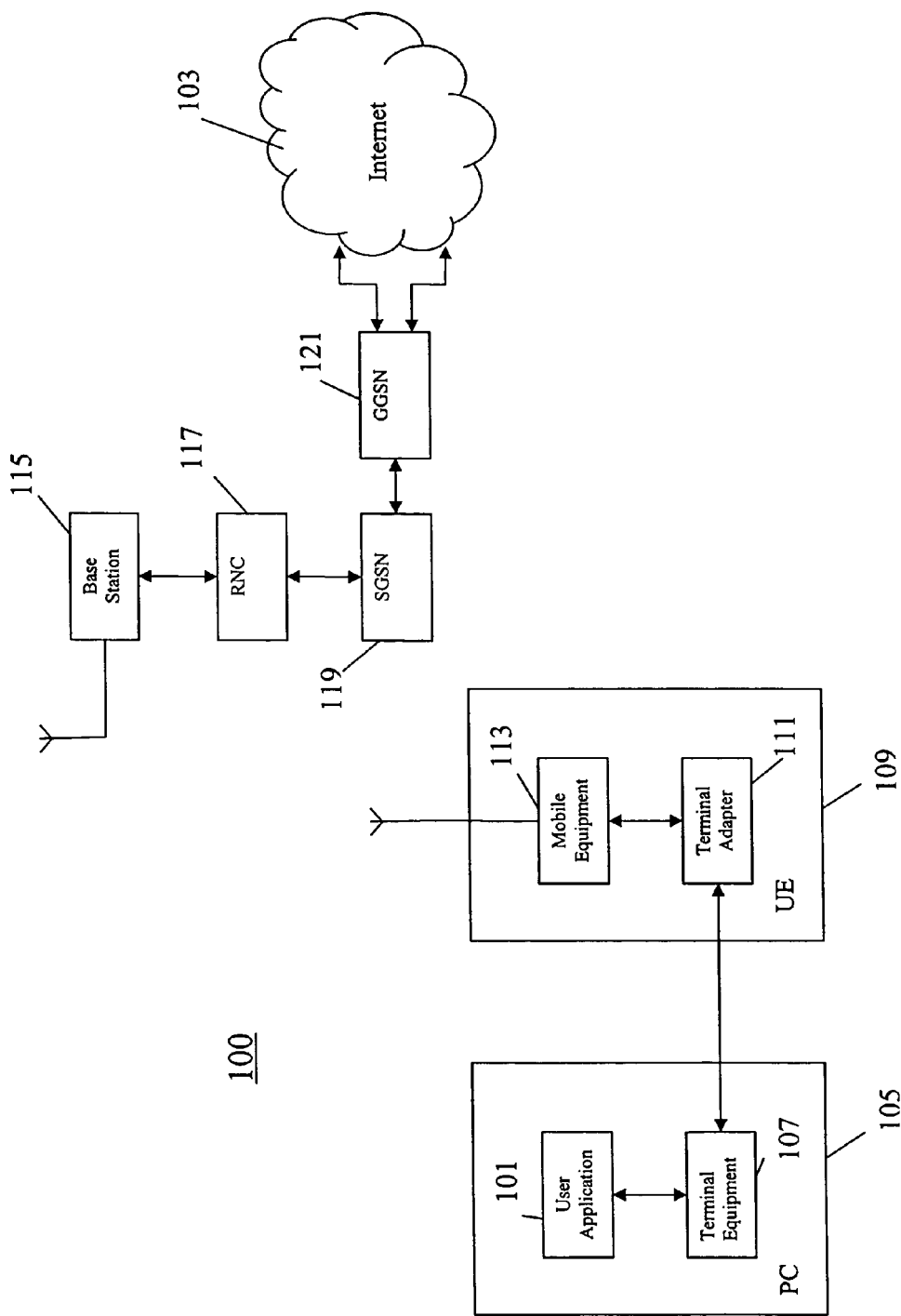
FIG. 1 illustrates a network in accordance with an embodiment of the invention.

FIG. 1 illustrates a network 100 in accordance with some embodiments of the invention. In the specific embodiment, a user application 101 is accessing the Internet 103 through a cellular communication system.

The network 100 of FIG. 1 comprises a personal computer (PC) 105 on which a user application 101 is running. For example, the user application 101 may be an Internet browser application. The user application 101 may operate through terminal equipment 107 coupled to wireless access equipment in the form of UMTS User Equipment (UE) 109. The UE 109 provides communication functionality for communicating over the air interface of the UMTS cellular communication system. The terminal equipment 107 may be considered to correspond to the hardware and interface control and operating system software of the PC 105 and the user application 101 may correspond to a user software application such as the Internet browser software.

The UE 109 comprises a terminal adapter 111, which is coupled to the terminal equipment 107 of the PC 105. The terminal adapter 111 and terminal equipment 107 provide the interface between the user application 101 and the UE 109. The communication is supported by an interface protocol and in particular a dial-up protocol may be used. The terminal adapter 111 is coupled to mobile equipment 113 which implements the required functionality for communicating over the air interface of the UMTS cellular communication system.

It will be appreciated that the physical and logical location, distribution and partitioning of the user application, the terminal equipment, the terminal adapter and the mobile equipment may be different in other embodiments. For example, the terminal adapter may be implemented as part of the physical device processing the user application or the terminal equipment may be part of the UE.

The mobile equipment 113 communicates with a base station 115 over the air interface of the cellular communication system. The cellular communication system comprises a fixed network which interconnects base stations allowing data to be routed between base stations. In addition, the fixed network comprises gateway functions for interconnecting to external networks such as the Public Switched Telephone Network (PSTN) or the Internet. Furthermore, the fixed network comprises much of the functionality required for managing a conventional cellular communication network including functionality for routing data, admission control, resource allocation, subscriber billing, mobile station authentication, etc.

In some embodiments, the cellular communication system may, for example, be or comprise the Global System for Mobile communication (GSM), which uses a technology known as Time Division Multiple Access (TDMA) wherein user separation is achieved by dividing frequency carriers into discrete time slots. Further, a description of the GSM TDMA communication system can be found in "The GSM System for Mobile Communications" by Michel Mouly and Marie Bernadette Pautet, Bay Foreign Language Books, 1992, ISBN 2950719007.

If the cellular communication system is a GSM cellular communication system, it may optionally include a General Packet Radio System (GPRS) developed for provision of packet data services. The GPRS system has been standardized as a possible add-on to an existing GSM communication system, and can be introduced to an existing GSM communication system by introducing new network elements. For example, a number of Serving GPRS Support Nodes (SGSN) and Gateway GPRS Support Nodes (GGSN) may be introduced to provide a packet based fixed network communication.

The cellular communication system of the described embodiment is a 3rd generation cellular communication system known as the Universal Mobile Telecommunication System (UMTS). UMTS uses Code Division Multiple Access (CDMA), Frequency Division Duplex (FDD) and/or Time Division Duplex (TDD) to provide user separation on the air interface. For separation, CDMA uses codes, FDD uses frequencies, and TDD uses time. In a UMTS communication system, the fixed network comprises a Core Network (CN) and a Radio Access Network (RAN). The CN is operable to route data from one part of the RAN to another, as well as providing gateway functionality to other communication systems such as the Internet. In addition, the CN performs many of the operation and management functions of a cellular communication system, such as billing. The RAN is operable to support wireless user equipment over a radio link being part of the air interface.

UMTS has been developed to provide significant compatibility with GSM cellular communication systems and in some communication systems GPRS packet data services may share a CN with a UMTS RAN. The UMTS CN is similarly to GPRS built around SGSNs and GGSNs. The RAN of a UMTS cellular communication system comprises the base stations, which in UMTS are known as Node Bs, as well as Radio Network Controllers (RNC), which control the Node Bs and the communication over the air interface.

For clarity and brevity, FIG. 1 illustrates only the elements of the fixed network involved in supporting a packet data session from the UE 109. The base station 115 is coupled to an RNC 117, which is further coupled to an SGSN 119 of the CN. The SGSN 119 is coupled to a GGSN 121, which provides a gateway function to the Internet 103. Thus, the user application 101 may connect to the Internet 103 through the cellular communication system and through the gateway interface provided by the GGSN 121. The GGSN 121 provides a plurality of different access points to the Internet 103. For example, different access points may be used depending on the Internet service provider supporting the user application 101.

In accordance with some embodiments, a data packet session is set up to support the user application 101 by using a suitable access point identifier. The access point identifier includes information that allows the CN to identify the appropriate destination GGSN. The access point identifier may be an access point name. In addition, the access point identifier is used by the GGSN to determine the appropriate access point for connecting to the Internet. For example, the UE 109 initiates the packet session by setting up a Packet Data Protocol (PDP) context for the session. The PDP context is used in a UMTS cellular communication system to set up a packet data session having a required quality of service. For example, the UE sets up a PDP context in accordance with the UMTS Technical Specifications.

As part of the PDP context set up, the UE transmits an access point name, which is used by the GGSN to access the appropriate access point of the Internet. For example, the UE transmits an access point name corresponding to a given Internet service provider as part of the PDP context set up and in response the GGSN sets up an Internet connection to the access point of that Internet service provider. Thus, the UE is operable to successfully attach to the RAN and create a user session to a desired location using an access point name.

In the embodiment of FIG. 1, the UE comprises memory for storing a first access point name. This allows the UE to set up a PDP context using the stored access point name when receiving a setup command from the terminal equipment. Thus, the UE may comprise a default access point name, e.g., indicative of a default Internet service provider. For example, if the UE is a wireless data modem provided by an Internet service provider named "abc.com", the UE may store a first access point name of "abc.com". Thus, whenever a new Internet session is set up, the UE may set up a PDP context using this access point name resulting in an Internet connection to the service provider "abc.com" being achieved.

In some embodiments, the first access point name is stored in permanent memory. Optionally, the first access point name may be changed to different values allowing for other access points to the Internet being supported by the UE. For example, the 3GPP Technical Specifications allow a method of reconfiguring the UE to store a different access point name via a dial-up command received from the terminal equipment 107. This command may specifically be the dial-up command AT+CGDCONT.

However, although this command does allow for the stored access point name to be changed, it provides a cumbersome process for changing the access point name. For example, the approach uses a separate configuration command thereby requiring increased signalling and configuration of the setup messages. Furthermore, the reconfiguration command is not generally known or understandable by the average user. Hence, reconfiguration requires specialist knowledge.

Additionally, most applications are not configured to support such a reconfiguration. For example, when substituting an existing dial-up modem by wireless access equipment for provision of Internet services, existing applications simply use the appropriate dial-up phone number for selecting the appropriate Internet service provider. Hence, in order to use existing applications, these applications have to be reconfigured to use dedicated reconfiguration commands in order to access the previous access provider rather than the access provider specified in the wireless access equipment. Typically, this will require manual reconfiguration of the individual applications, which is highly undesirable for the general user.

Typically, wireless access equipment is provided with an installation program, which is executed when the wireless access equipment is initially set up. Thus, the program will typically set up the first access point name to the name of the Internet service provider providing the wireless access equipment. However, in many cases, it is desirable to use the wireless access equipment with different Internet service providers. For example, a computer may be used for both professional and leisure activities. A home worker may access the Internet through his employer's access point during working hours while desiring to use the same wireless access equipment with his own Internet access provider after working hours. In this case, it is advantageous if a more flexible and user friendly means of controlling and selecting Internet access points is provided.

Accordingly, some embodiments of the invention provide for dynamic selection between the stored first access point name and a second access point name directly in response to a parameter of the session setup command. For example, the stored first access point name may be considered a default access point name, which is used in the absence of a specific access point name being specified in the session setup command. However, if a specific access point name is specified in the session setup command, this name is used for the current session.

Figure 2:
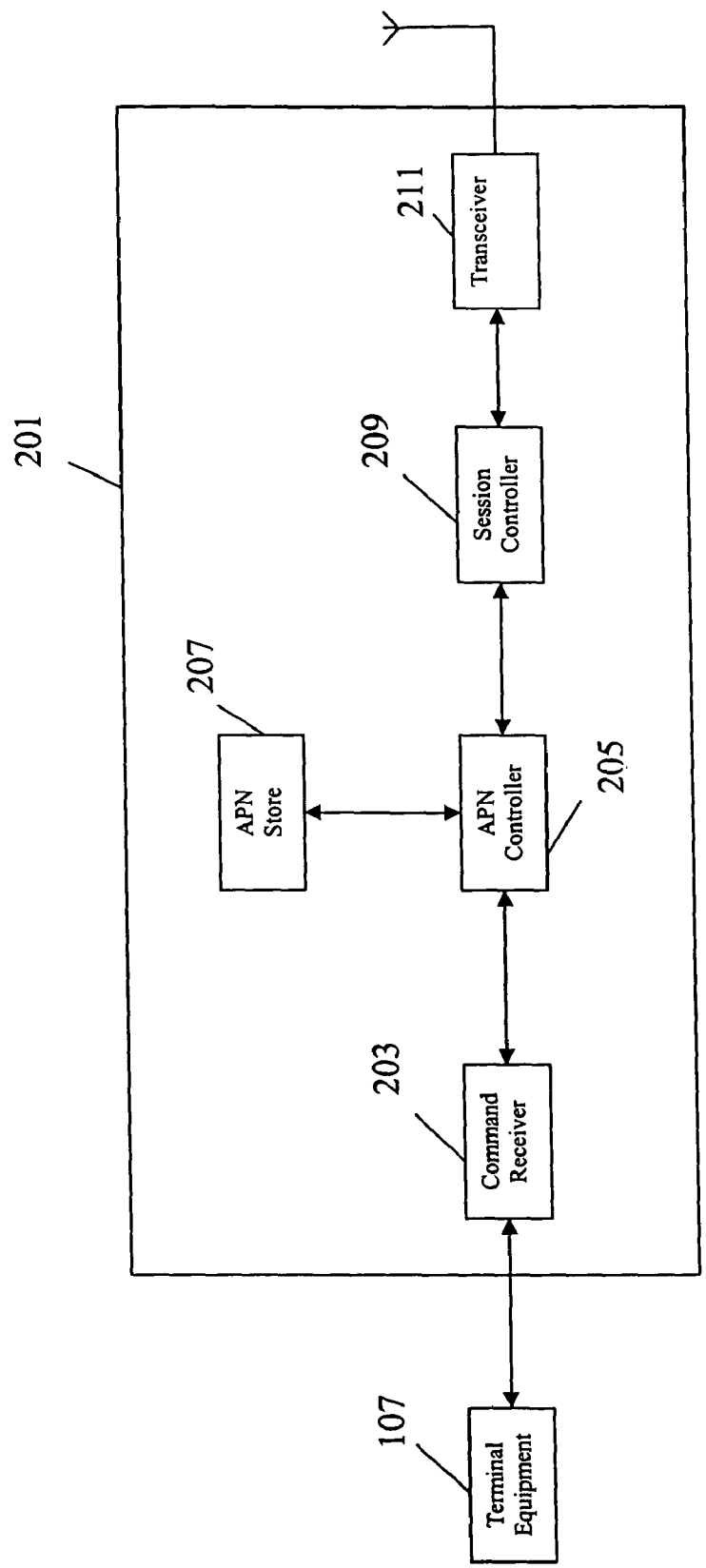
FIG. 2 illustrates wireless access equipment in accordance with an embodiment of the invention.

FIG. 2 illustrates wireless access equipment 201 in accordance with some embodiments of the invention. The wireless access equipment 201 corresponds to the UE 109 of FIG. 1 and will be described in more detail with reference to this Figure. The wireless access equipment 201 communicates with the terminal equipment 107, which provides the interface to the user application 101.

In accordance with an optional feature of the invention, the interface protocol is a dial-up protocol suitable for a dial-up modem. Thus, the terminal equipment 107 may communicate with the wireless access equipment 201 as if it was a dial-up modem. For example, the interface protocol may be the AT (attention) command set, which is an international standard for terminal to modem interface control. The 3rd Generation Partnership Project Technical Specification 3GPP TS 27.007 (described above) has specifically been defined for use in UMTS.

The AT command set is a mature dial-up protocol which is widely used. In particular, it is used by many dial-applications for Internet access through a dial-up modem. Accordingly, using the AT command allows easy compatibility with many existing applications and interfaces.

In accordance with some embodiments, the wireless access equipment 201 comprises a command receiver 203, which receives the AT commands from the terminal equipment 107. The appropriate commands related to access point names and packet data session setup are passed to an APN (Access Point Name) controller 205. The APN controller 205 is coupled to an APN store 207 wherein a first access point name may be stored.

In accordance with an optional feature, the APN controller 205 may be operable to store a default access point name in the APN store 207. For example, when an AT+CGDCONT<parameter 1> command is received, the APN controller 205 extracts <parameter 1> and stores it in the APN store 207. Hence, the AT+CGDCONT command may be used by a modem control application of the PC to set up the default access point name to be used by the wireless access equipment 201.

The default access point name may be loaded during installation of the wireless access equipment 201. The installation program provided with the wireless access equipment 201 may optionally download the default access point name to the wireless access equipment 201 by sending the command AT+CGDCONT <parameter 1> from the terminal equipment 107 to the wireless access equipment 201. The value of <parameter 1> may be changed depending on the specific service provider that has delivered the wireless access equipment 201. This allows a flexible setup of the wireless access equipment 201 for the specific Internet service provider by simply modifying a parameter of the installation program without requiring any hardware changes. A manufacturer of the wireless access equipment 201 may manufacture standard wireless access equipment 201 and customize to a specific Internet service provider simply by modifying the installation software provided with the wireless access equipment 201.

The APN controller 205 is furthermore coupled to a session controller 209, which is operable to set up a packet data session of the cellular communication system. The packet data session will be set up to provide access to the Internet using an access point name when the APN controller 205 receives a session setup command.

In some embodiments, the APN controller 205 detects if an ATD dial command is received and if so, it instigates the session controller 209 to set up the packet data session. The session controller 209 proceeds to set up a packet data session by setting up a PDP context for a connection to an appropriate Internet access point. Hence, the access point name is used to determine the suitable GGSN providing the appropriate gateway to the Internet and the access point name may be included in a PDP Context Activate Request. The fixed network recognizes the access point name and in response provides the wireless access equipment 201 with the destination information to be used for the packet data session.

The session controller 209 is coupled to a transceiver 211, which comprises the required functionality for communicating over the air interface and may comprise the required functionality for supporting a packet data session (setup).

In accordance with some embodiments, the APN controller 205 is operable to select the session access point name used by the session controller 209. The APN controller 205 may select either the default access point name stored in the APN store 207 or a second access point name depending on a parameter of the session setup command.

The APN controller 205 may select the default access point name when the session setup command comprises a predetermined value. For example, if an ATD command is received with a dial string of <*99#>, the stored access point name is used.

Alternatively, the ATD command may comprise an indication of another access point name to be used. In some embodiments, this indication may be used by the access point name to identify, generate, calculate, derive or retrieve a second access point name that may be used instead of the default access point name. However, the session setup command may optionally have a parameter that comprises the second access point name directly. For example, the dial string of the ATD command may specify the second access point name directly.

Hence, as a specific example, if the access point name "abc.com" has been stored in the APN store 207 by a previous AT+CGDCONT command, the receipt of an ATD <*99#> will result in the APN controller 205 controlling the session controller 209 to set up a PDP context using the access point name of "abc.com". However, the receipt of an ATD <def.com> command will result in the APN controller 205 extracting the parameter <def.com> and using this parameter as the session access point name. Thus, the session controller 209 will proceed to set up the PDP context using the access point name of "def.com". As another example, the receipt of an ATD <0800 123 456> command will result in the APN controller 205 extracting the parameter <0800 123 456> and using this as the session access point name. In each case, the fixed network comprises functionality for recognizing the access point name and for setting up a packet data session with the appropriate Internet gateway destination.

Thus, the described embodiment provides a flexible Internet access wherein a default access point name may be overridden by an access point name provided with the session setup command itself. In some embodiments, the wireless access equipment is configured with information required to successfully attach to the fixed network and to create a packet data session to a desired location. The ATD dial command is used such that the dial string sent to the wireless access equipment may be used dynamically as an access point name by the wireless access equipment to be fed into the PDP Context Activate Request to be used for this connection to the network. After disconnecting, a future connection to the network could request a different APN. This opens the possibility for the user to have a number of different connection profiles and to select an appropriate access point name on a per call basis.

A very convenient method is provided for selecting Internet service providers and in particular for easily supporting a plurality of Internet service providers by the same wireless access equipment using a cellular communication system to connect to the Internet.

Furthermore, the some embodiments provide for the standard dial-up AT command set to be used for controlling the selected access point name and thus which Internet service provider is used for the specific session. This allows for enhanced user friendliness as many existing applications can be used without any modifications simply by extracting the required information from the AT commands generated by the application. Furthermore, a manual modification is significantly facilitated by a simple interface and the use of well known and standardized commands, which are known from dial-up modems.

For example, a PC may run a Microsoft™ Windows™ application using a dial-up modem. The application may be an Internet browser which when started initiates a dial-up connection to an Internet service provider using a dial-up modem. The application initiates the connection by sending an ATD <0800 123 456> command to the dial-up modem wherein the parameter indicates the telephone number of the Internet service providers dial-in service.

If the PC is upgraded to use wireless access equipment from a different Internet service provider, the installation program may download the access point name of the new Internet service provider to the APN store of the wireless access equipment. Accordingly, applications using the default <*99#>dial string will access the Internet through the new Internet service provider. However, if the application specifies a dial-up phone number as in ATD <0800 123 456>, the wireless access equipment 201 will use the telephone number as the access point name for the packet data session. The fixed network will recognize the telephone number <0800 123 456> as belonging to the original Internet service provider. Accordingly, an Internet session will be set up using the original Internet service provider. Hence, in the example, the application may retain the opportunity of connecting to the original Internet service provider through the wireless access equipment. Furthermore, the access of the original Internet service provider is achieved without requiring any additional commands, setup or information. Rather, the same dial-string is automatically used by the system to direct the session to the appropriate access point through the cellular communication system.

The user may thus easily manage access to a plurality of Internet access providers through the cellular communication system. For example, a plurality (or all) of the applications running on a PC may use the same modem control software. In this case, an Internet service provider may be selected simply by modifying the dial-up string used by this software. For example, a home worker may be provided with wireless access equipment for a specific Internet service provider by his employer. The wireless access equipment may optionally be set up to use the default access point name by the employer. However, for private use, the user may simply retain his original private Internet access provider by simply amending the dial string used by the modem control software from the default value to the dial-up phone number of the private Internet access provider.

In some embodiments, the wireless access equipment preserves the first access point name when the controller selects the second access point name. The default access point name stored in the APN store 207 is only modified if a new AT+CGDCONT command is received. Thus, the default access point name is not permanently overridden but only substituted for the current call.

However, in some embodiments, the wireless access equipment may set the first access point name to the second access point name if the controller selects the second access point name. In such embodiments, any new access point name received in an ATD command may be stored in the APN store and used as the default value until a new access point name is received. This may allow the default Internet service provider to automatically be the last provider explicitly set by an ATD command. Hence, if an Internet service provider is explicitly requested, this will be used by all applications until a new Internet service provider is specifically requested. This may facilitate switching between different Internet service providers.

It will be appreciated that although the above description focused on the interface protocol between the terminal equipment and the wireless access equipment being an ATD dial-up command set interface, other interface protocols and connections may be used.

For example, the connection may be part of a digital network such as an Ethernet network. The interface protocol may optionally be a direct point to point protocol between the terminal equipment and the wireless access equipment. For example, the interface protocol may be a Point to Point Protocol over Ethernet (PPPoE) protocol.

The PPPoE is used to provide a familiar dial-up interface to a user while allowing an indirect or direct Ethernet communication between two devices. PPPoE defines two phases of operation, discovery and session. In the discovery phase, a PPPoE host device requiring service sends out Ethernet broadcast messages indicating the service it requires. One or more PPPoE servers may respond with an offer to provide the service. The PPPoE host selects one of the responding servers and sends a service request to that server with the exact service name required.

In a PPPoE embodiment, a PPPoE service name may be sent to the UE in the PPPoE service request part of the PPPoE negotiation between host (the terminal equipment) and server (the wireless access equipment). This service name is used by the wireless access equipment, being a PPPoE server, as the second access point name. Thus, the access point name for the specific packet data session may be derived from the service name and used in the PDP Context Activate Request to the fixed network. If the service name is a predetermined value, this may be used by the APN controller as an indication to use the stored access point name from the APN store. For example, if a service name of "wireless broadband" as received, the APN controller retrieves the access point name from the APN store and initiates the PDP context with this access point name. Thus, the service name is used as an access point name indicator similarly to the use of the dial string for an AT command set embodiment.

It will be appreciated that the above description for clarity has described embodiments of the invention with reference to different functional units and processors. However, it will be apparent that any suitable distribution of functionality between different functional units or processors may be used without detracting from the invention. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of multiple units or as part of other functional units. As such, the invention may be implemented in a single unit or may be physically and functionally distributed between different units and processors.

Although the present invention has been described in connection with the some embodiments, it is not intended to be limited to the specific forms set forth herein. Rather, the scope of the present invention is limited only by the claims. Additionally, although a feature may appear to be described in connection with a particular embodiment, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by, e.g., a single unit or processor. Additionally, although individual features may be included in different claims, these may possibly be advantageously combined, and the inclusion in different claims does not imply that a combination of features is not feasible and/or advantageous. In addition, singular references do not exclude a plurality. Thus references to "a", "an", "first", "second" etc. do not preclude a plurality.

I claim:

1. A User Equipment (UE) for accessing a data network through a cellular communication system, the UE comprising:
   a memory, for storing a first access point identifier, prior to receiving a session setup command, wherein the session setup command comprises at least one of an Attention Dial (ATD) command and a Point to Point Protocol over Ethernet (PPPoE) service identifier message;
   a receiver, for receiving the session setup command from a terminal equipment in accordance with an interface protocol;
   a first controller for selecting, in response to a parameter of the session setup command, a session access point identifier for a packet data session of the cellular communication system, wherein, in response to the parameter of the session setup command, the first controller selects as the session access point identifier either:
      (i) the first access point identifier; or
      (ii) a second access point identifier comprised in the session setup command; and
   a second controller for setting up a packet data session of the cellular communication system from the UE to the data network, in response to receiving the session setup command, and using the selected session access point identifier;

such that the UE uses the first access point identifier to set up the packet data session, unless the session setup command requires the UE to use the second access point identifier to set up the packet data session.

2. The UE as claimed in claim 1 further comprising a third controller for determining the second access point identifier from the parameter of the session setup command.

3. The UE as claimed claim 1 wherein the parameter of the session setup command comprises the second access point identifier.

4. The UE as claimed in claim 1 wherein the first controller is configured to select the first access point identifier if the parameter has a predetermined value.

5. The UE as claimed in claim 1 wherein the UE is configured to preserve the first access point identifier in response to the first controller selecting the second access point identifier.

6. The UE as claimed in claim 1 wherein the UE is configured to set the first access point identifier to the second access point identifier if the first controller selects the second access point identifier.

7. The UE as claimed in claim 1 wherein the interface protocol is a dial-up protocol.

8. The UE as claimed in claim 1 wherein the interface protocol is a point to point protocol.

9. The UE as claimed in claim 1 wherein the interface protocol is an AT command interface protocol as defined in the 3$^{rd}$ Generation Partnership Project Technical Specification 3GPP TS 27.007.

10. The UE as claimed in claim 1 wherein the parameter is a dial string of the ATD command.

11. The UE as claimed in claim 10 wherein the first controller is configured to select the session access point identifier if the dial string has a predetermined value.

12. The UE as claimed in claim 10 wherein the first controller is configured to set the session access point identifier to a value of the dial string if the dial string does not have a predetermined value.

13. The UE as claimed in claim 1 wherein the interface protocol is a Point to Point Protocol over Ethernet (PPPoE) protocol.

14. The UE as claimed in claim 1 wherein the second controller for setting up the packet data session is configured to initiate a Packet Data Protocol (PDP) context using the session access point identifier.

15. The UE as claimed in claim 1 further comprising a third controller for setting the first access point identifier to a value in response to receiving a packet data session destination command.

16. The UE as claimed in claim 15 wherein the packet data session destination command comprises an access point identifier.

17. The UE as claimed in claim 1 wherein the cellular communication system is a UMTS cellular communication system.

18. A network comprising a User Equipment (UE) as claimed in claim 1 and further comprising:

a processor for operating a data network application; and
an interface controller for transmitting commands to the UE using the interface protocol in response to the data network application.

19. The network as in claim 18 wherein the data network is a dial-up network.

20. A method in a User Equipment (UE), of accessing a data network through a cellular communication system, the method comprising:

storing a first access point identifier at the UE, prior to receiving a session setup command, wherein the session setup command comprises at least one of an Attention Dial (ATD) command and a Point to Point Protocol over Ethernet (PPPoE) service identifier message;

receiving the session setup command from a terminal equipment in accordance with an interface protocol;

selecting, in response to a parameter of the session setup command, a session access point identifier for a packet data session of the cellular communication system, wherein, in response to the parameter of the session setup command, the session access point identifier is selected to be either:
  (i) the first access point identifier; or
  (ii) a second access point identifier comprised in the session setup command; and setting up a packet data session of the cellular communication system from the UE to the data network in response to receiving the session setup command, and using the selected session access point identifier;

such that the UE uses the first access point identifier to set up the packet data session, unless the session setup command requires the UE to use the second access point identifier to set up the packet data session.

21. The method of claim 20 wherein the method further comprises preserving the first access point identifier in response to selecting the second access point identifier.

22. The method of claim 20 wherein the method further comprises setting the first access point identifier to the second access point identifier if the second access point identifier has been selected.

23. The method of claim 20 wherein the interface protocol is a dial-up protocol.

24. The method of claim 20 wherein the interface protocol is a point to point protocol.

25. The method of claim 20 wherein the interface protocol is an AT command interface protocol as defined in the 3rd Generation Partnership Project Technical Specification 3GPP TS 27.007.

26. The method of claim 20 wherein the parameter is a dial string of the ATD command.

27. The method of claim 26 wherein the method further comprises setting the session access point identifier to a value of the dial string if the dial string does not have a predetermined value.

28. A non-transitory computer-readable medium storing instructions for performing a method, in a user equipment (UE), of accessing a data network through a cellular communication system, the method comprising:

storing a first access point identifier at the UE, prior to receiving a session setup command, wherein the session setup command comprises at least one of an Attention Dial (ATD) command and a Point to Point Protocol over Ethernet (PPPoE) service identifier message;

receiving the session setup command from a terminal equipment in accordance with an interface protocol;

selecting, in response to a parameter of the session setup command, a session access point identifier for a packet data session of the cellular communication system, wherein, in response to the parameter of the session setup command, the session access point identifier is selected to be either:

(i) the first access point identifier; or
(ii) a second access point identifier comprised in the session setup command; and
setting up a packet data session of the cellular communication system from the UE to the data network in response to receiving a the session setup command, and using the selected session access point identifier;
the UE using the first access point identifier to set up the packet data session, unless the session setup command requires the UE to use the second access point identifier to set up the packet data session.

29. The non-transitory computer-readable medium as in claim 28 wherein the method further comprises preserving the first access point identifier in response to selecting the second access point identifier.

30. The non-transitory computer-readable medium as in claim 28 wherein the method further comprises setting the first access point identifier to the second access point identifier if the second access point identifier has been selected.

31. The non-transitory computer-readable medium as in claim 28 wherein the interface protocol is a dial-up protocol.

32. The non-transitory computer-readable medium as in claim 28 wherein the interface protocol is a point to point protocol.

33. The non-transitory computer-readable medium as in claim 28 wherein the interface protocol is an AT command interface protocol as defined in the 3rd Generation Partnership Project Technical Specification 3GPP TS 27.007.

34. The non-transitory computer-readable medium as in claim 28 wherein the parameter is a dial string of the ATD command.

35. The non-transitory computer-readable medium as in claim 34 wherein the method further comprises setting the session access point identifier to a value of the dial string if the dial string does not have a predetermined value.

* * * * *

UNITED STATES PATENT AND TRADEMARK OFFICE
CERTIFICATE OF CORRECTION

PATENT NO. : 7,835,330 B2  Page 1 of 1
APPLICATION NO. : 10/873065
DATED : November 16, 2010
INVENTOR(S) : Andrew James Parker It is certified that error appears in the above-identified patent and that said Letters Patent is hereby corrected as shown below:

IN THE CLAIMS:

Column 17, Claim 28, Line 6: Delete "a" after "receiving"

Signed and Sealed this
Twenty-second Day of February, 2011

David J. Kappos
*Director of the United States Patent and Trademark Office*